(12) United States Patent
Tajan et al.

(10) Patent No.: US 11,719,107 B2
(45) Date of Patent: Aug. 8, 2023

(54) TURBINE ENGINE COMPRISING A ROTOR WITH VARIABLE-PITCH BLADES

(71) Applicant: SAFRAN AIRCRAFT ENGINES, Paris (FR)

(72) Inventors: Sébastien Emile Philippe Tajan, Moissy-Cramayel (FR); Régis Eugène Henri Servant, Moissy-Cramayel (FR); Gilles Alain Marie Charier, Moissy-Cramayel (FR); Emmanuel Pierre Dimitri Patsouris, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/283,365

(22) PCT Filed: Oct. 7, 2019

(86) PCT No.: PCT/FR2019/052371
§ 371 (c)(1),
(2) Date: Apr. 7, 2021

(87) PCT Pub. No.: WO2020/074817
PCT Pub. Date: Apr. 16, 2020

(65) Prior Publication Data
US 2021/0381388 A1    Dec. 9, 2021

(30) Foreign Application Priority Data
Oct. 12, 2018 (FR) ...................................... 1859479

(51) Int. Cl.
*F01D 25/16* (2006.01)
*F01D 7/00* (2006.01)
(Continued)

(52) U.S. Cl.
CPC ................ *F01D 7/00* (2013.01); *B64C 11/38* (2013.01); *B64C 11/44* (2013.01); *F01D 25/16* (2013.01);
(Continued)

(58) Field of Classification Search
CPC .... F01D 7/00; F05D 2260/74; F05D 2260/76; B64C 11/30; B64C 11/38
See application file for complete search history.

(56) References Cited

U.S. PATENT DOCUMENTS 2,850,103 A * 9/1958 Pearl ...................... B64C 11/38
416/157 R
3,420,311 A * 1/1969 Chilman ................ B64C 11/30
416/245 R
(Continued)

FOREIGN PATENT DOCUMENTS

EP    1306558 A1    5/2003
EP    3165452 A1    5/2017
(Continued)

OTHER PUBLICATIONS

International Search Report dated Feb. 25, 2020, issued in corresponding International Application No. PCT/FR2019/052371, filed Oct. 7, 2019, 3 pages.
(Continued)

*Primary Examiner* — Justin D Seabe
(74) *Attorney, Agent, or Firm* — Christensen O'Connor Johnson Kindness PLLC

(57) ABSTRACT

A turbine engine including: a rotor having at least one variable-pitch blade which is guided to rotate on bearings relative to a fixed structure; a system for controlling the pitch of the at least one blade, the control system being rigidly secured to the rotor and including a first actuator driven by energy, and the control system further being disposed axially
(Continued)

upstream of the bearings; a device for transferring the energy, which is disposed axially between the bearings, the transfer device including a stationary element and a mobile element; wherein the rotor is annular and delimits an inner space which is open towards the upstream side and inside of which the control system is disposed.

10 Claims, 2 Drawing Sheets

(51) Int. Cl.
| | | |
|---|---|---|
| *B64C 11/38* | (2006.01) | |
| *B64C 11/44* | (2006.01) | |
| *F02K 3/06* | (2006.01) | |
| *F04D 29/36* | (2006.01) | |

(52) U.S. Cl.
CPC ............... *F02K 3/06* (2013.01); *F04D 29/36* (2013.01); *F05D 2220/32* (2013.01); *F05D 2240/30* (2013.01); *F05D 2240/54* (2013.01); *F05D 2250/231* (2013.01); *F05D 2260/40311* (2013.01); *F05D 2270/52* (2013.01); *F05D 2270/56* (2013.01)

(56) References Cited

U.S. PATENT DOCUMENTS

| | | | | |
|---|---|---|---|---|
| 3,720,060 | A | * | 3/1973 | Davies ...................... F02K 3/06 |
| | | | | 415/129 |
| 3,866,415 | A | * | 2/1975 | Ciokajlo .................... F01D 7/00 |
| | | | | 416/157 R |
| 3,912,418 | A | * | 10/1975 | Andrews ................. F01D 25/18 |
| | | | | 416/174 |
| 5,451,141 | A | * | 9/1995 | Carvalho ................ B64C 11/44 |
| | | | | 416/165 |
| 5,595,474 | A | | 1/1997 | Girard |
| 2003/0077173 | A1 | | 4/2003 | Franchet et al. |
| 2017/0234324 | A1 | | 8/2017 | Niergarth et al. |
| 2017/0306773 | A1 | | 10/2017 | de Wergifosse |

FOREIGN PATENT DOCUMENTS

| | | | |
|---|---|---|---|
| FR | 2712250 | A1 | 5/1995 |
| FR | 3050433 | A1 | 10/2017 |
| GB | 2285098 | A | 6/1995 |
| GB | 2461786 | A | 1/2010 |

OTHER PUBLICATIONS

Written Opinion of the International Searching Authority dated Feb. 25, 2020, issued in corresponding International Application No. PCT/FR2019/052371, filed Oct. 7, 2019, 6 pages.

International Preliminary Report on Patentability dated Apr. 8, 2021, issued in corresponding International Application No. PCT/FR2019/052371, filed Oct. 7, 2019, 1 page.

First Chinese Office Action dated Nov. 18, 2022, issued in corresponding Chinese Patent Application No. CN 201980066540.0, filed Oct. 7, 2019, 15 pages.

* cited by examiner

TURBINE ENGINE COMPRISING A ROTOR WITH VARIABLE-PITCH BLADES

TECHNICAL FIELD

Embodiments of the current disclosure relate to a turbine engine comprising a rotor supporting variable pitch blades, and more precisely an engine architecture optimized and adapted to such a turbine engine.

BACKGROUND

A turbine engine can comprise a rotor provided with variable pitch blades, i.e. blades whose pitch (and more precisely the pitch angle) can be adjusted according to the flight parameters, so as to optimise the operation of the turbine engine. As a reminder, the pitch angle of a blade corresponds to the angle, in a longitudinal plane perpendicular to the axis of rotation of the blade, between the chord of the blade and the plane of rotation of the rotor.

Such a turbine engine comprises a system for controlling the pitch of the blades. The controlling system generally comprises an actuator common to all blades and a mechanism specific to each blade, the mechanism being configured to transform the movement initiated by the actuator into a rotary movement of the corresponding blade.

Traditionally, the actuator is secured to the fixed structure of the turbine engine (i.e. placed in a fixed reference frame) and the various mechanisms are secured to the rotor (i.e. placed in a rotating reference frame). In addition, the controlling system comprises a load transfer bearing (LTB) to ensure that the movement initiated by the actuator (fixed reference frame) is transmitted to the mechanisms (rotating reference frame).

The movement of the actuator makes it possible to synchronously adjust the pitch of all the blades via the load transfer bearing and the various mechanisms.

It is also known from document EP-A1-3165452 that the actuator and the mechanisms are secured to the rotor (rotating reference frame). The controlling system (i.e. the actuator and mechanisms) is positioned in a closed annular enclosure bounded by the rotor. The actuator here is a hydraulic actuator. The controlling system thus comprises a rotary union (or rotary joint) to transfer hydraulic energy from the fixed to the rotating reference frame.

Having the actuator in a rotating reference frame means that a load transfer bearing is not required to transmit the movement of the actuator from the fixed to the rotating reference frame, but also means that telescopic servitudes are not required to supply hydraulic power to the actuator.

However, the architecture described in the above-mentioned document has disadvantages. The rotor has a high mass and large dimensions. In fact, the rotor has a parallelogram-shaped cross-section defining the enclosure in which the controlling system in particular is placed. In addition, such an architecture presents a disadvantage during a maintenance operation on the controlling system. Indeed, during such a maintenance operation, it is necessary to dismantle the rotor in order to access the controlling system placed inside, to the detriment of productivity.

The applicant also noted that it is important to limit the angular displacement of the rotor during operation at the rotary union in order to avoid the appearance of hydraulic leaks and to maximise the service life of the latter.

The objective of the present disclosure is thus to propose a turbine engine with an optimised engine architecture making it possible to remedy the aforementioned drawbacks and meet the aforementioned expectations.

SUMMARY

For this purpose, the present disclosure provides a turbine engine with a longitudinal axis X comprising:
 a rotor supporting at least one variable pitch blade, the rotor being guided in rotation with respect to a fixed structure of the turbine engine via a first bearing and a second bearing;
 a system for controlling the pitch of the at least one blade, the controlling system being secured to the rotor and having at least a first actuator set in motion by an energy, the controlling system being arranged axially upstream of the first and second bearings;
 a device for transferring the energy disposed axially between the first bearing and the second bearing, the transferring device having a fixed member secured to the fixed structure and a moving member secured to the rotor;

wherein the rotor can be annular and can define an inner space open toward the upstream side and inside of which the controlling system can be placed.

Such an arrangement of the controlling system, i.e. upstream of the first and second bearings and in the inner space, makes it possible to simplify the rotor, and consequently to reduce the weight and size of the latter, but also to significantly simplify the maintenance of the controlling system. In fact, to access the controlling system, the inlet cone simply has to be removed.

In addition, the axial arrangement of the transferring device between the first bearing and the second bearing prevents hydraulic leakage (when the energy transferred is hydraulic energy) and maximises the service life of the latter. This is because the angular displacement is minimised at the portion of the rotor axially between the first and second bearing. Thus, when the turbine engine is in operation, the mechanical stresses of the moving member on the fixed member are minimised.

The turbine engine according to the disclosure may comprise one or more of the following characteristics, taken in isolation from each other or in combination with each other:
 the rotor can include a ring for supporting the at least one blade and a shaft having a frustoconical portion and a cylindrical portion on which the first and second bearings as well as the moving member of the transferring device are attached;
 the first actuator is a hydraulic actuator, the transferring device being a rotary union, the controlling system can include a mechanism configured to transform the movement initiated by the hydraulic actuator into a rotary movement of the at least one blade;
 the first actuator is an electric actuator, the transferring device being a rotary transformer, the controlling system can include a mechanism configured to transform the movement initiated by the electric actuator into a rotary movement of the at least one blade;
 the first actuator is an electric motor having a rotary output shaft, the at least one blade being rotatable about a axis Y substantially perpendicular to the axis X, the mechanism including a crank having a first end centred on the axis Y and rotatably coupled to the at least one blade and a second end having a cam follower eccentric to the axis Y, the cam follower cooperating with a cam in the form of a groove made in a ring, the ring being rotationally coupled to the output shaft of the electric motor;

the transferring device is a rotary transformer, the first actuator is an electric motor configured to actuate a pump of a hydraulic circuit secured to the rotor, the circuit including a liquid tank connected with the pump, the circuit having a second hydraulic actuator supplied with pressurized liquid by the pump, the controlling system having a mechanism configured to transform the movement initiated by the second actuator into a rotary movement of the at least one blade;

the circuit comprises an accumulator configured to feather the at least one blade, in particular in the event of failure of the rotary transformer;

the rotor is guided in rotation with respect to an annular support of the fixed structure, the support being attached to an inner hub of an intermediate casing, the support having a frustoconical upstream wall, a frustoconical downstream wall and a tubular cylindrical wall in which the first bearing and the fixed member of the transferring device are housed, the cylindrical wall being disposed axially between the upstream wall and the downstream wall;

the first bearing is disposed upstream of the second bearing;

the rotor is coupled in rotation to a planet carrier of a reduction gear.

DESCRIPTION OF THE DRAWINGS

The disclosure will be better understood and other details, characteristics and advantages of the disclosure will appear more clearly when reading the following description made as a non-limiting example and with reference to the annexed drawings in which.

DETAILED DESCRIPTION

Figure 1:
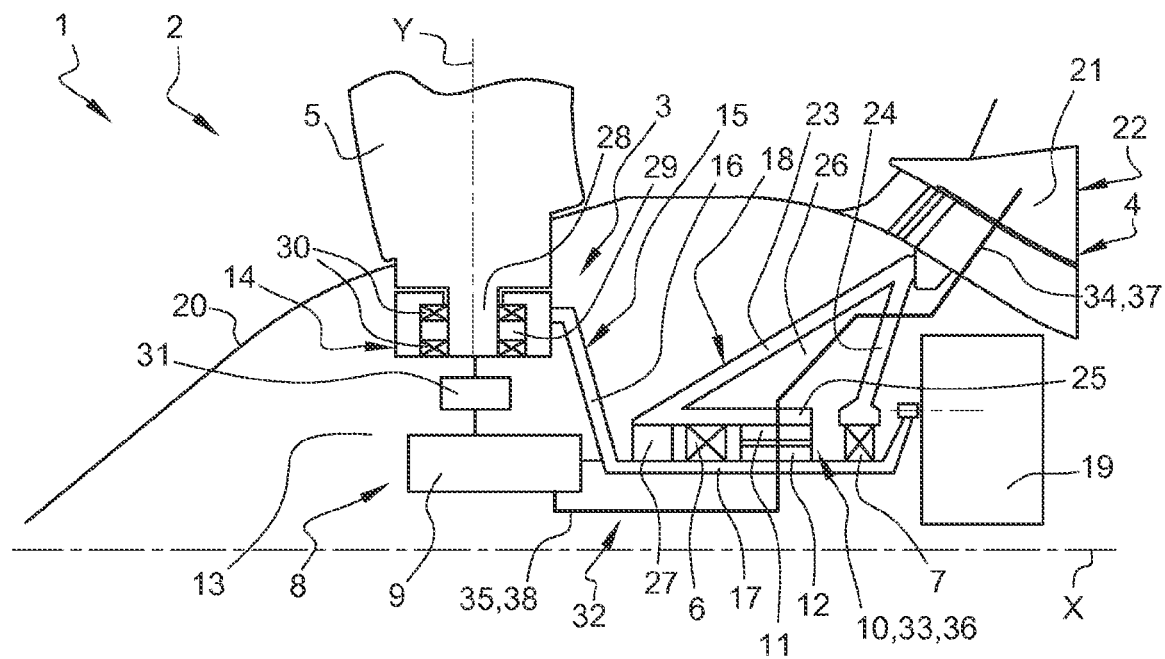
FIG. 1 is a schematic axial (or longitudinal) half-section view of a partially represented aircraft turbine engine, according to a first embodiment.

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

FIGS. 1 to 4 show a partial representation of a turbine engine 1 with longitudinal axis X and a ducted fan 2. The fan 2 comprises a rotor 3 which is movable (about the axis X) relative to a fixed structure 4, with the rotor 3 supporting a series of variable pitch blades 5. The fan 2 is located upstream of a gas generator comprising, for example, a low-pressure compressor, a high-pressure compressor, a combustor, a high-pressure turbine and a low-pressure turbine.

By convention, in this application the terms "upstream" and "downstream" are defined in relation to the direction of gas flow in the fan 2 (or turbine engine 1). Similarly, by convention in this Application, "internal", "external", "inner" and "outer" are defined radially with respect to the longitudinal axis X of the turbomachine 1, which is in particular the axis of rotation of the compressor and turbine rotors.

The rotor 3 is guided in rotation relative to the fixed structure 4 of the turbine engine 1 via a first bearing 6 and a second bearing 7. The turbine engine 1 comprises a pitch 8 for at least one blade 5. The controlling system 8 is secured to the rotor 3 and comprises at least a first actuator 9 which is moved (or actuated) by an energy. The controlling system 8 is arranged axially upstream of the first and second bearings 6, 7. The turbine engine 1 further comprises a device 10 for transferring the energy arranged axially between the first bearing 6 and the second bearing 7. The transferring device 10 comprises a fixed member 11 secured to the fixed structure 4 and a moving member 12 secured to the rotor 3. The rotor 3 is annular and defines an inner space 13 open toward the upstream side and inside of which the controlling system 8 is placed.

It should be noted that the embodiments illustrated in FIGS. 1 to 4 are in no way limiting, the engine architecture according to the disclosure could, for example, be incorporated into the rotor of a non-ducted fan of a turbine engine, and in particular a turbine engine better known as "Open Rotor" which generally comprises a non-ducted fan or two non-ducted fans that are counter-rotating. In the case of an "Open Rotor" with two counter-rotating non-ducted fans called "Pusher" (i.e. with the fans placed downstream of the gas generator), the engine architecture according to the disclosure could be adapted more particularly to the rotor of the downstream fan. In the case of an "Open Rotor" with two counter-rotating non-ducted fans called "Puller" (i.e. with the fans placed upstream of the gas generator), the engine architecture according to the disclosure could be adapted more particularly to the rotor of the upstream fan.

According to the embodiments illustrated in FIGS. 1 to 4, the rotor 3 comprises a ring 14 for supporting the blades 5 and an annular shaft 15 having a frustoconical portion 16 and a cylindrical portion 17 on which the first and second bearings 6, 7 as well as the moving member 12 of the transferring device 10 are attached. The rotor 3 is guided in rotation relative to an annular support 18 of the fixed structure 4. The rotor 3 is rotated by a turbine shaft via a speed reduction gear 19. The reduction gear 19 is an epicyclic reduction gear. The rotor 3 is rotationally coupled to a planet carrier of the reduction gear 19, the planet carrier forming the output shaft of the reduction gear 19. In addition, the rotor 3 comprises an inlet cone 20 which is centred on the axis X and flares from upstream to downstream. Removing the inlet cone 20 allows access to the controlling system 8, especially during a maintenance operation.

According to the embodiments illustrated in FIGS. 1 to 4, the support 18 is mounted on an inner hub 21 of an intermediate casing 22. The support 18 comprises a frustoconical-shaped upstream wall 23, a frustoconical-shaped downstream wall 24 and a tubular cylindrical wall 25 in which the first bearing 6 and the fixed member 11 of the transferring device 10 are housed. The second bearing 7 is housed in an opening provided in the downstream wall 24. The cylindrical wall 25 is arranged axially between the upstream wall 23 and the downstream wall 24. The upstream and downstream walls 23, 24, and the cylindrical portion 17 of the shaft 15 define between them an annular enclosure 26 (commonly known as the "oil enclosure") in which the first and second bearings 6, 7 are housed and lubricated. The upstream and downstream walls 23, 24 flare from upstream to downstream. The cylindrical wall 25 extends here from the inner end of the upstream wall 23. The first and second bearings 6, 7 respectively guide the shaft 15 of the rotor 3 in rotation relative to the cylindrical wall 25 and the downstream wall 24 of the support 18. The first bearing 6 is located upstream of the second bearing 7. The first bearing 6 is for example a roller bearing. The second bearing 7 is for example a ball bearing. The sealing means 27 are placed upstream of the first bearing 6 between the cylindrical wall 25 and the cylindrical portion 17 of the shaft 15, so that the enclosure 26 is sealed.

By way of concrete example, the support 18 could be broken down into two separate assemblies, namely a first assembly comprising the upstream wall 23 and the cylindrical wall 25 and a second assembly comprising only the downstream wall 24. Both sets would then be flanged to the inner hub using common fastening means such as screws.

According to the embodiments illustrated in FIGS. 1 to 4, each blade 5 comprises a root 28 mounted in a housing 29 of the ring 14 via two bearings 30 so that the blade 5 is mobile in rotation around an axis Y substantially perpendicular to the axis X.

Figure 2:
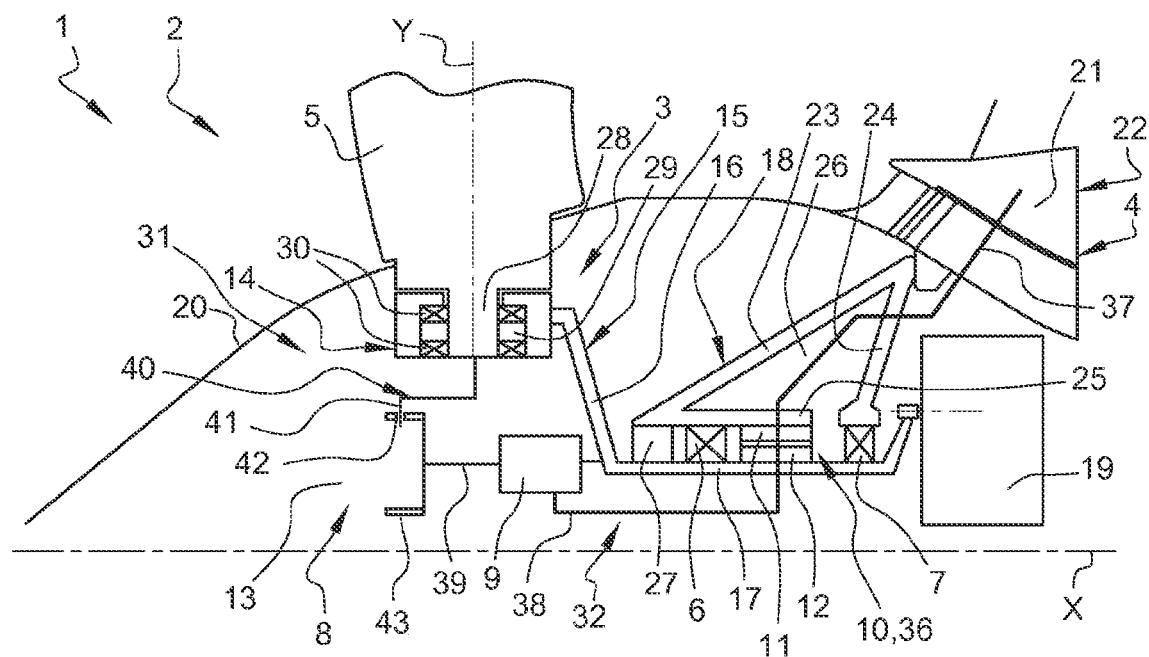
FIG. 2 is a schematic axial half-section view of a partially represented aircraft turbine engine in a second embodiment.
Figure 3:
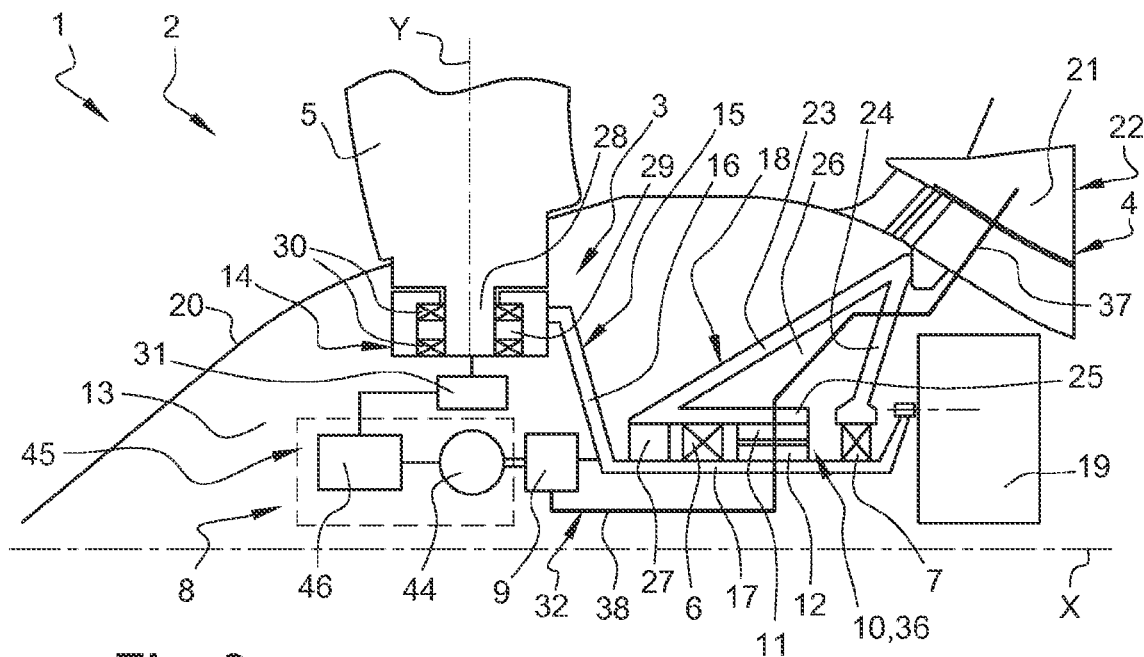
FIG. 3 is a schematic axial half-section view of a partially represented aircraft turbine engine in a third embodiment.

According to the embodiments shown in FIGS. 1 to 3, the ring 14 is disposed upstream of the shaft 15. The frustoconical portion 16 of the shaft 15 is disposed upstream of the cylindrical portion 17 of the shaft 15. The frustoconical portion 16 flares out from downstream to upstream. The ring 14 has a larger diameter than the cylindrical portion 17 of the shaft 15. The controlling system 8 is placed under the ring 14.

According to the first embodiment illustrated in FIG. 1, the controlling system 8 comprises at least a first actuator 9 and a mechanism 31 specific to each of the blades 5.

The controlling system 8 comprises either a first actuator 9 for each blade 5 or one or more first actuators 9 for all the blades 5.

Advantageously, the controlling system 8 comprises a first actuator 9 common to all blades 5 and a mechanism 31 specific to each of the blades 5, this mechanism 31 making it possible to transform the movement initiated by the first actuator 9 into a rotary movement of the corresponding blade 5. The movement of the first actuator 9 makes it possible to synchronously adjust the pitch of all the blades 5 via in particular the various mechanisms 31.

The first actuator 9 can be either a hydraulic or an electric actuator.

If the first actuator 9 is a hydraulic actuator, the energy to be transported to the actuator is hydraulic energy, i.e. a pressurized liquid such as oil. The actuator is supplied with hydraulic energy via a power supply unit 32. The power supply unit 32 comprises the device 10 for transferring the hydraulic energy from the fixed reference frame (connected to the fixed structure 4) to the rotating reference frame (connected to the rotor 3), this transferring device 10 being here a rotary union 33 (or rotating joint). The rotary union 33 comprises a fixed member 11 secured to the support 18 (and more precisely to the cylindrical wall 25) and a moving member 12 secured to the rotor 3 (and more precisely to the cylindrical portion 17). The rotary union 33 ensures the transmission of hydraulic energy from the fixed member 11 to the moving member 12 (or vice versa) in a sealed manner.

The rotary union 33 can comprise one or more tracks. The supply assembly 32 further comprises at least one pipe 34 connected to the fixed member 11 of the rotary union 33, and at least one pipe 35 connected to both the moving member 12 of the rotary union 33 and the first actuator 9.

If the first actuator 9 is an electric actuator, the energy to be transported to the actuator is electrical energy, i.e. electricity. The actuator is supplied with electrical energy via a power supply unit 32. The power supply unit 32 comprises the device 10 for transferring the electrical energy from the fixed reference frame (connected to the fixed structure 4) to the rotating reference frame (connected to the rotor 3), this transferring device 10 being here a rotary transformer 36 (or rotary transformer). The rotary transformer 36 ensures the transmission of electrical energy by means of electromagnetic induction. Such a transformer is, for example, described in more detail in documents EP-A1-1306558 and FR-A1-2712250. The rotary transformer 36 comprises a fixed member 11 secured to the support 18 and a moving member 12 secured to the rotor 3. The power supply unit 32 also comprises at least one cable 37 connected to the fixed member 11 of the rotary transformer 36 and at least one cable 38 connected to both the moving member 12 of the rotary transformer 36 and the first actuator 9.

The first actuator 9 comprises a fixed element in relation to the rotor 3 and a moving element in relation to the fixed element (and therefore in relation to the rotor 3). The fixed element of the first actuator 9 is fixed to the rotor 3. The moving element is linked to at least one mechanism 31. The first actuator 9 can be linear or rotary.

The mechanism 31 comprises, for example, for each blade, a crank with a first end centred on the axis Y and rotationally coupled to the corresponding blade and a second end eccentric to the axis Y and secured to the moving element of the first actuator 9. The crank handle is used to multiply the force required to adjust the pitch of the corresponding blade.

According to the second embodiment illustrated in FIG. 2, the controlling system 8 comprises at least a first actuator 9 and a mechanism 31 specific to each of the blades 5.

The controlling system 8 comprises either a first actuator 9 for each blade 5 or one or more first actuators 9 for all blades 5.

Advantageously, the controlling system 8 comprises a first actuator 9 common to all blades 5 and a mechanism 31 specific to each of the blades 5. This mechanism 31 makes it possible to transform the movement initiated by the first actuator 9 into a rotary movement of the corresponding blade 5.

More precisely, the first actuator 9 is an electric motor comprising a rotating output shaft 39. For each blade 5, the mechanism 31 comprises a crank 40 with a first end centred on the axis Y and rotationally coupled with the corresponding blade 5, and a second end with a cam follower 41 eccentric to the axis Y. The cam follower 41 cooperates with a cam 42 in the form of a groove made in a ring 43, the ring 43 being rotationally coupled to the output shaft 39 of the electric motor.

The rotary movement of the output shaft 39 of the electric motor allows synchronized adjustment of the pitch of all the blades 5, in particular via the various mechanisms 31 (for each mechanism 31, a cam 42/cam follower 41 assembly and a crank 40).

The stator of the electric motor is fixed to the rotor 3.

The electric motor may comprise a reduction gear. For example, the ring 43 is rotationally coupled to the motor output shaft 39 via a spline or serrated connection.

The power supply unit 32 of the electric motor is identical to that of an electric actuator detailed above in connection with the first embodiment.

According to the third embodiment illustrated in FIG. 3, the controlling system 8 comprises a first actuator 9 common to all blades 5 and a mechanism 31 specific to each blade 5.

Specifically, the first actuator 9 is an electric motor configured to drive a pump 44 of a hydraulic circuit 45 secured to the rotor 3. The circuit 45 comprises a liquid tank (or reservoir) connected to the pump 44. The circuit 45 comprising a second hydraulic actuator 46 supplied with pressurized liquid by the pump 44. The mechanism 31 is configured to transform the movement initiated by the second actuator 46 into a rotary movement of the corresponding blade 5.

Advantageously, the second actuator 46 is common to all blades 5.

The rotary movement of the rotor of the electric motor makes it possible to synchronously adjust the pitch of all the blades 5 via the hydraulic circuit 45 and the various mechanisms 31.

The hydraulic circuit 45 is said to be autonomous (or independent) in terms of hydraulic energy, and in other words the hydraulic circuit 45 does not receive hydraulic energy from the fixed reference frame.

The stator of the electric motor is fixed to the rotor 3.

The second actuator 46 comprises a fixed element in relation to the rotor 3 and a moving element in relation to the fixed element (and therefore in relation to the rotor 3). The moving element is linked to the mechanisms 31. The second actuator 46 can be linear or rotary.

Mechanism 31 comprises, for example, for each blade, a crank with a first end centred on the axis Y and coupled in rotation with the corresponding blade and a second end eccentric with respect to the axis Y and secured to the moving element of the second actuator 46.

Advantageously, the circuit 45 comprises an accumulator configured to feather the blades, particularly in the event of failure of the rotary transformer 36. The accumulator is, for example, a pressurized liquid reservoir.

In addition, the circuit 45 can comprise one or more pre-actuators configured to, among other things, control the flow of pressurized liquid within the circuit 45. A pre-actuator is, for example, a distributor, valve or servo valve. The electric motor may comprise a reduction gear.

The power supply 32 of the electric motor is identical to that of an electric actuator detailed above in relation to the first embodiment.

Figure 4:
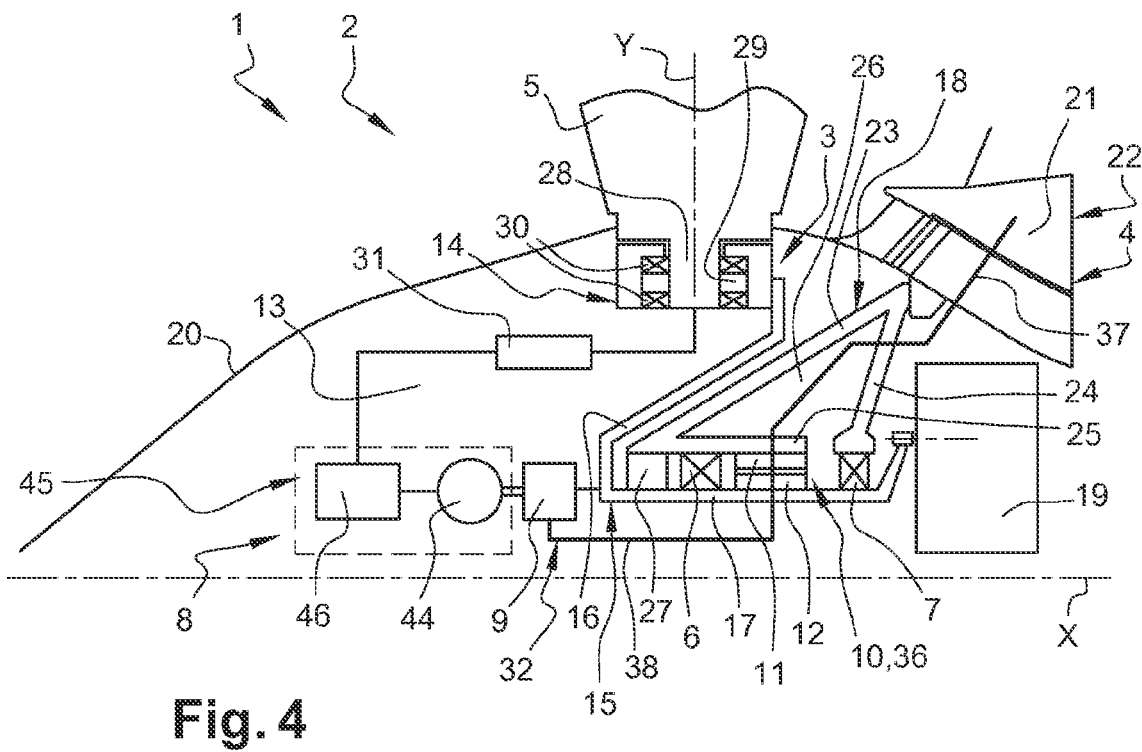
FIG. 4 is a schematic axial half-section view of a partially represented aircraft turbine engine in a fourth embodiment.

According to the fourth embodiment shown in FIG. 4, the ring 14 is disposed around the shaft 15. The frustoconical portion 16 of the shaft 15 extends around the cylindrical portion 17 of the shaft 15. The frustoconical portion 16 flares from upstream to downstream. The frustoconical portion 16 and the cylindrical portion 17 of the shaft 15 form an axial half-cut pin.

The controlling system 8 of the fourth embodiment is identical to that of the third embodiment.

In comparison to the third embodiment, the engine architecture of the fourth embodiment has in particular a reduced axial dimension.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 10% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A turbine engine with a longitudinal axis (X), comprising:
   a rotor supporting at least one variable pitch blade and an inlet cone, the rotor being guided in rotation relative to a fixed structure of the turbine engine via a first bearing and a second bearing;
   a controlling system for controlling the pitch of the at least one blade, the controlling system being secured to the rotor and having at least one first actuator set in motion by an energy, the controlling system being arranged axially upstream of the first and second bearings; and
   a transferring device for transferring the energy disposed axially between the first bearing and the second bearing, the transferring device having a fixed member secured to the fixed structure and a moving member secured to the rotor,
   wherein the rotor is annular and defines a downstream portion of an inner space, wherein the inlet cone defines an upstream portion of the inner space that fluidly connected with the downstream portion of the inner space, and wherein the controlling system is positioned inside of the inner space.

2. The turbine engine according to claim 1, wherein the rotor includes a ring for supporting the at least one blade and a shaft having a frustoconical portion and a cylindrical portion on which the first and second bearings and the moving member of the transferring device are attached.

3. The turbine engine according to claim 1, wherein the first actuator is a hydraulic actuator, the transferring device being a rotary union, the controlling system comprising a mechanism configured to transform the movement initiated by the hydraulic actuator into a rotary movement of the at least one blade.

4. The turbine engine according to claim 1, wherein the first actuator is an electric actuator, the transferring device being a rotary transformer, the controlling system comprising a mechanism configured to transform the movement initiated by the electric actuator into a rotary movement of the at least one blade.

5. The turbine engine according to claim 4, wherein the first actuator includes an electric motor comprising a rotary output shaft, the at least one blade being rotatable about an axis (Y) substantially perpendicular to the axis (X), the mechanism comprising a crank having a first end centred on the axis (Y) and rotationally coupled with the at least one blade and a second end having a cam follower eccentric with respect to the axis (Y), cam follower cooperating with a cam in the form of a groove made in a ring, the ring being rotationally coupled to the output shaft of the electric motor.

6. The turbine engine according to claim 1, wherein the transferring device is a rotary transformer, the first actuator includes an electric motor configured to actuate a pump of a hydraulic circuit secured to the rotor, the circuit comprising a liquid tank connected with the pump, the circuit comprising a second hydraulic actuator supplied with pressurised liquid by the pump, the controlling system comprising a mechanism configured to transform the movement initiated by the second actuator into a rotary movement of the at least one blade.

7. The turbine engine according to claim 6, wherein the circuit includes an accumulator configured to feather the at least one blade.

8. The turbine engine according to claim 1, wherein the rotor is guided in rotation with respect to an annular support of the fixed structure, the support being attached to an inner hub of an intermediate casing, the support comprising a frustoconical upstream wall, a frustoconical downstream wall and a tubular cylindrical wall in which the first bearing and the fixed member of the transferring device are housed, the cylindrical wall being disposed axially between the upstream wall and the downstream wall.

9. The turbine engine according to claim 8, wherein the first bearing is disposed upstream of the second bearing.

10. The turbine engine according to claim 1, wherein the rotor is coupled in rotation to a planet carrier of a reduction gear.

\* \* \* \* \*